(12) United States Patent
Lee et al.

(10) Patent No.: US 12,474,496 B2
(45) Date of Patent: Nov. 18, 2025

(54) GREEN INFORMATION MEASURING SYSTEM AND GREEN INFORMATION MEASURING METHOD

(71) Applicant: VC INC., Seoul (KR)

(72) Inventors: Hakyong Lee, Yongin-si (KR); Kichool Park, Seoul (KR); Juno Kim, Seoul (KR); Hohyeong Lee, Seoul (KR)

(73) Assignee: VC INC., Seoul (KR)

( * ) Notice: Subject to any disclaimer, the term of this patent is extended or adjusted under 35 U.S.C. 154(b) by 559 days.

(21) Appl. No.: 17/858,208

(22) Filed: Jul. 6, 2022

(65) Prior Publication Data

US 2023/0009278 A1    Jan. 12, 2023

(30) Foreign Application Priority Data

Jul. 6, 2021    (KR) .......................... 10-2021-0088732

(51) Int. Cl.
| | |
|---|---|
| G01V 3/08 | (2006.01) |
| A63B 57/00 | (2015.01) |
| A63B 57/30 | (2015.01) |
| G01N 33/24 | (2006.01) |
| G01V 3/02 | (2006.01) |

(52) U.S. Cl.
CPC .............. *G01V 3/08* (2013.01); *A63B 57/505* (2015.10); *A63B 57/357* (2015.10); *A63B 2220/12* (2013.01); *A63B 2220/17* (2013.01); *A63B 2220/78* (2013.01); *A63B 2220/803* (2013.01); *A63B 2225/50* (2013.01); *G01N 33/246* (2013.01); *G01V 3/02* (2013.01)

(58) Field of Classification Search
CPC .......... G01V 3/08; G01V 3/02; A63B 57/505; A63B 57/357; A63B 2220/12; A63B 2220/17; A63B 2220/78; A63B 2220/803; A63B 2225/50; G01N 33/246; G01N 27/041; G01N 33/24; G01D 21/02; G01S 19/01; G08C 17/02
USPC ........................................................ 324/219
See application file for complete search history.

(56) References Cited

U.S. PATENT DOCUMENTS

| | | | |
|---|---|---|---|
| 2005/0122104 A1* | 6/2005 | Corver ................... | G01N 24/08 324/309 |
| 2012/0017674 A1* | 1/2012 | Kumar .................... | G01M 3/16 318/116 |

(Continued)

FOREIGN PATENT DOCUMENTS

| | | |
|---|---|---|
| JP | H10-187235 | 7/1998 |
| JP | 2002-210062 | 7/2002 |

(Continued)

OTHER PUBLICATIONS

KR 20210041138 machine translation, Apr. 15, 2021 (Year: 2021).*
JP 2020051846 Machine Translation, Apr. 2, 2020 (Year: 2020).*

*Primary Examiner* — Raul J Rios Russo
(74) *Attorney, Agent, or Firm* — LEX IP MEISTER, PLLC

(57) ABSTRACT

An embodiment of the present invention provides a green information measuring system, including: a first device configured to measure an electrical characteristic of soil through at least one electrode when a first condition is satisfied; and a second device configured to receive soil information of the soil from the first device and to transmit the soil information to a server when a second condition is satisfied.

11 Claims, 14 Drawing Sheets

(56) References Cited

U.S. PATENT DOCUMENTS

| | | | | |
|---|---|---|---|---|
| 2012/0036941 A1* | 2/2012 | Drahm | ............... | G01F 1/60 |
| | | | | 73/861.12 |
| 2014/0062509 A1* | 3/2014 | Bellin | ............ | G01R 27/2605 |
| | | | | 324/686 |
| 2023/0063350 A1* | 3/2023 | Chuang | ............ | G01R 29/24 |
| 2024/0264125 A1* | 8/2024 | Lee | ............ | G01N 29/12 |
| 2024/0304480 A1* | 9/2024 | Chuang | ............ | G01R 29/24 |

FOREIGN PATENT DOCUMENTS

| | | |
|---|---|---|
| JP | 2017-151042 | 8/2017 |
| JP | 2020-051843 | 4/2020 |
| KR | 10-2008-0089958 | 10/2008 |
| KR | 10-2012-0009306 | 2/2012 |
| KR | 10-2015-0072674 | 6/2015 |
| KR | 10-1780213 | 9/2017 |
| KR | 10-2021-0041138 | 4/2021 |

* cited by examiner

GREEN INFORMATION MEASURING SYSTEM AND GREEN INFORMATION MEASURING METHOD

CROSS-REFERENCE TO RELATED APPLICATION

This application claims priority to and benefits of Korean Patent Application No. 10-2021-0088732, filed in the Korean Intellectual Property Office on Jul. 6, 2021, the entire contents of which are incorporated herein by reference.

BACKGROUND (a) Field

The present disclosure relates to a green information measuring system and a green information measuring method.

(b) Description of the Related Art

Golf is a sport in which a golfer hits a golf ball into a hole in a golf course. Grass is planted and managed in a teeing ground, a fairway, a green, a rough, etc. of a golf course.

Since grass planted on a golf course varies depending on ground conditions of the golf course, e.g., temperature and humidity, salinity of a ground, etc., maintaining a turf growing environment is one of the most important tasks in turf management.

A manager sprays fertilizers or nutrients to facilitate growth of grass planted on the golf course, and also sprays pesticides to prevent pests and diseases.

The manager has to look around the golf course having a large area and check it with the naked eye to manage the grass planted in the golf course, and thus there are problems in that the work is overloaded, it takes a lot of time, and a management cost increases.

Particularly, the green, where the hole is located, is an area where expensive lawns are densely planted, and a construction cost is high, so special management is required.

The above information disclosed in this Background section is only for enhancement of understanding of the background, and therefore, it may contain information that does not form the prior art that is already known in this country to a person of ordinary skill in the art.

SUMMARY

Embodiments have been made in an effort to provide a green information measuring system and a green information measuring method for easily measuring information related to soil of a green.

Embodiments have been made in an effort to provide a green information measuring system and a green information measuring method for providing a golfer with a changed hole position.

An embodiment of the present invention provides a green information measuring system, including: a first device configured to measure an electrical characteristic of soil through at least one electrode when a first condition is satisfied; and a second device configured to receive soil information of the soil from the first device and to transmit the soil information to a server when a second condition is satisfied.

The first device may include a counter, and the first condition may be whether the counter value has reached a first value.

The second condition may be whether the counter value has reached a second value, and the second value may be greater than or equal to the first value.

The first condition may be whether a first time has elapsed since the electrical characteristic of the soil was recently measured.

The second condition may be whether a second time has elapsed since receiving the soil information of the soil from the first device.

The first device may include a first coupling portion that is engageable to a first end of a flagpole, and the second device may include a second coupling portion that is engageable to a body of a flagpole.

The first device may include: a housing configured to include the at least one electrode and the first coupling portion; and a sensor configured to measure the electrical characteristic through the at least one electrode.

An outer appearance of the housing may have a cylindrical shape, and the at least one electrode may extend in a circumferential direction of the cylinder on a side surface of the housing.

The at least one electrode may be arranged spaced apart from each other in a height direction of the cylinder.

An outer appearance of housing may have a cylindrical shape, and the at least one electrode may extend in a height direction of the cylinder on a side surface of the housing.

The at least one electrode may be arranged spaced apart from each other in a circumferential direction of the cylinder.

An outer appearance of housing may have a cylindrical shape, and a first end of the at least one electrode may be coupled to a lower surface of the housing, while a second end may extend in a height direction of the cylinder to be away from the lower surface of the housing.

The housing may include at least one opening extending through an exterior and an interior, and the sensor may be positioned in an inner space positioned inside the housing, while the sensor and the at least one electrode may be electrically connected to each other through the at least one opening.

The first device may include: an antenna electrode configured to extend in a circumferential direction of the cylinder on a side surface of the housing and closest to an upper surface of the cylinder; and a wireless communication unit connected to the antenna electrode to provide connection to the second device.

The second device may obtain GPS position data corresponding to a current position when a third condition is satisfied.

The second device may include a counter, and the third condition may be whether the counter value has reached the third value.

The second device may include a motion detection sensor, and the third condition may be whether the motion detection sensor detects movement.

An embodiment of the present invention provides a green information measuring method, including: a first device measuring an electrical characteristic of soil through at least one electrode when a first condition is satisfied; and a second device receiving soil information of the soil from the first device to transmit the soil information to a server when a second condition is satisfied.

The first device may include a counter, and the first condition may be whether the counter value has reached a first value, the second condition may be whether the counter value has reached a second value, and the second value may be greater than or equal to the first value.

The first condition may be whether a first time has elapsed since the electrical characteristic of the soil was recently measured, and the second condition may be whether a second time has elapsed since the soil information of the soil was received from the first device.

According to the embodiments, there is an effect that a manager can be conveniently provided with a condition of soil of a green located in each golf course.

According to the embodiments, there is an effect that a golfer can be provided with a changed position of a hole quickly.

According to embodiments, a battery can be used for a long time without being frequently replaced by minimizing power consumption of a green information measuring apparatus and a hole position updating apparatus.

DETAILED DESCRIPTION OF THE EMBODIMENTS

Figure 1:
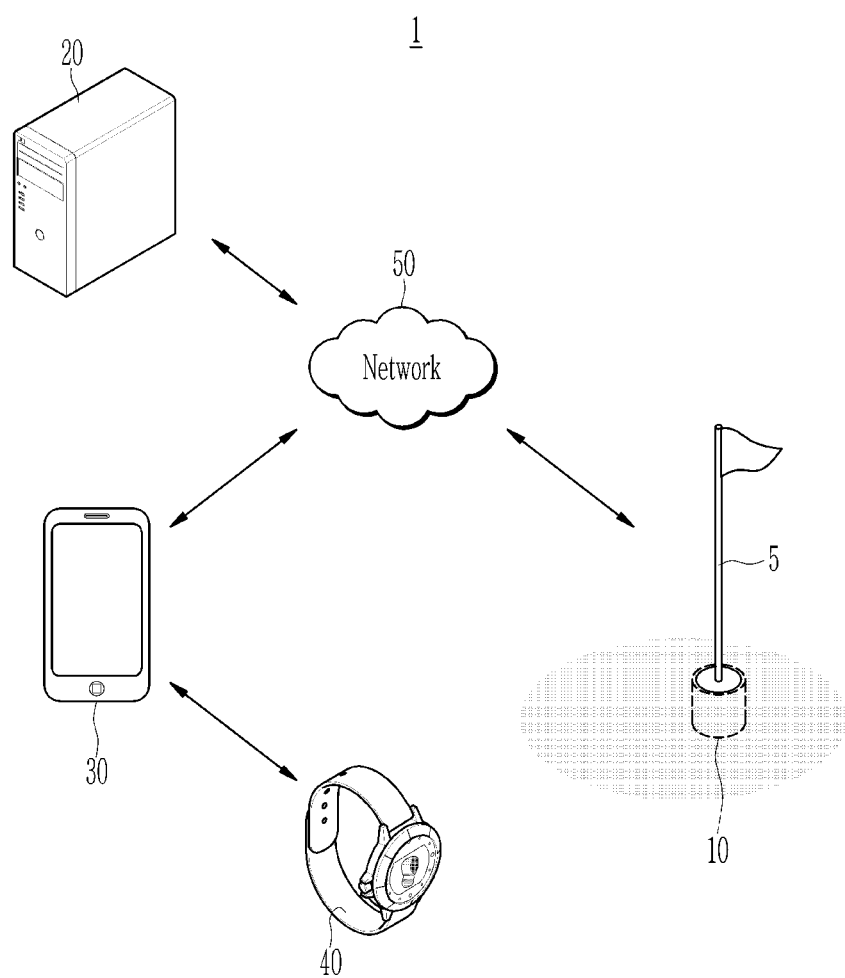
FIG. 1 illustrates a schematic diagram for describing a green information measuring system according to embodiments.

The present invention will be described more fully hereinafter with reference to the accompanying drawings, in which embodiments are shown. As those skilled in the art would realize, the described embodiments may be modified in various different ways, all without departing from the spirit or scope of the present invention.

To clearly describe the present invention, parts that are irrelevant to the description are omitted, and like numerals refer to like or similar constituent elements throughout the specification.

Further, since sizes and thicknesses of constituent members shown in the accompanying drawings are arbitrarily given for better understanding and ease of description, the present invention is not limited to the illustrated sizes and thicknesses. In the drawings, the thicknesses of layers, films, panels, regions, etc., are exaggerated for clarity. In the drawings, for better understanding and ease of description, the thicknesses of some layers and areas are exaggerated.

It will be understood that when an element such as a layer, film, region, or substrate is referred to as being "on" another element, it can be directly on the other element or intervening elements may also be present. In contrast, when an element is referred to as being "directly on" another element, there are no intervening elements present. Further, in the specification, the word "on" or "above" means positioned on or below the object portion, and does not necessarily mean positioned on the upper side of the object portion based on a gravitational direction.

In addition, unless explicitly described to the contrary, the word "comprise" and variations such as "comprises" or "comprising" will be understood to imply the inclusion of stated elements but not the exclusion of any other elements.

Further, in the specification, the phrase "in a plan view" means when an object portion is viewed from above, and the phrase "in a cross-sectional view" means when a cross-section taken by vertically cutting an object portion is viewed from the side.

FIG. 1 illustrates a schematic diagram for describing a green information measuring system according to embodiments.

Referring to FIG. 1, the green information measuring system 1 according to the embodiments may include a green information measuring apparatus 10, a hole position updating apparatus 12, a server 20, a mobile communication device 30, and a golf distance measuring device 40. However, a scope of the present invention is not limited thereto, and the green information measuring system 1 may further include more additional components than those illustrated in FIG. 1, and some components may be omitted.

The green information measuring apparatus 10 may be implemented in the form of a hole cup. A flagpole 5 may be coupled to the green information measuring apparatus 10. The green information measuring apparatus 10 may measure soil information at a first point on a green (i.e., a position of a hole), and may detect a changed position of the hole. When changing the position of the hole is needed, a user, i.e., a greenkeeper, may use a hole cutter to move the hole positioned at the first point to a second point. For example, the greenkeeper may excavate the second point on the green by pushing an excavation unit of the hole cutter into the ground while rotating the hole cutter left and right. The excavation unit may be maintained in a state in which soil excavated at the second point is fixed therein. The greenkeeper may fill the hole at the first point by installing the green information measuring apparatus 10 at a newly excavated second point and then inserting the soil fixed by the excavation unit into the first point. Then, the green information measuring apparatus 10 may measure soil information at the second point (i.e., the changed position of the hole), and may detect the changed position of the hole. A more detailed description of the green information measuring apparatus 10 will be described later with reference to FIG. 2 and FIG. 3.

The hole position updating apparatus 12 may be implemented in a form coupled to the flagpole 5 to detect the position of the hole, more precisely, the position of the flagpole 5. Since the flagpole 5 is installed on the hole cup, when the position of the hole is changed, a position of the flagpole 5 may inevitably change, and accordingly, the hole position updating apparatus 12 coupled to the flagpole 5 may detect the changed position of the hole. A more detailed description of the hole position updating apparatus 12 will be described later with reference to FIG. 10 and FIG. 11.

The server 20 may be a computing device that provides a service to at least one of the hole position updating apparatus 12, the mobile communication device 30, or the golf distance measuring device 40 through a network 50. That is, the server 20 may include any computing device, such as a personal computer, a blade server, or a main frame, that can provide services to other devices or software by driving server software.

The server 20 may provide a service that guides golf course-related information, including golf course information, green position information, green soil information, and hole position information to at least one of a display connected to the server 20, the mobile communication device 30, or the golf distance measuring device 40.

The server 20 may provide a service that guides golf course-related information, including golf course information, green position information, green soil information, and hole position information to at least one of a display connected to the server 20, the mobile communication device 30, or the golf distance measuring device 40. This will be described with reference to FIG. 13 and FIG. 14.

In addition, the server 20 may perform a service of providing a position of a hole to a golfer. Specifically, the server 20 may receive position information of the hole position updating apparatus 12 from the hole position updating apparatus 12.

For example, in the case where the hole position updating apparatus 12 transfer its own GPS position to the server 20, when the GPS position received from the hole position updating apparatus 12 has a difference beyond a predetermined range from the position of the hole pre-stored in the server 20, the server 20 may update the pre-stored position of the hole to the GPS position, and may guide the updated hole position to the golfer through at least one of the mobile communication device 30 or the golf distance measuring device 40.

As another example, the hole position updating apparatus 12 may be implemented to determine whether it is required to update its own GPS position. Specifically, when the hole position pre-stored in the hole position updating apparatus and a newly measured GPS position have a difference beyond a predetermined range, the hole position updating apparatus 12 may update the pre-stored hole position to the GPS position, and may transmit the GPS position to the server 20. Then, the server 20 may provide the golfer with the GPS position received from the hole position updating apparatus 12 as the updated hole position.

The mobile communication device 30 may be a terminal capable of accessing the server 20 through the network 50. The mobile communication device 30 may provide golf course related information provided by the server 20 to the user. For example, the mobile communication device 30 may be a smart phone, a mobile phone, a tablet computer, a laptop computer, etc. capable of accessing a mobile communication network, but the scope of the present invention is not limited thereto.

The golf distance measuring device 40 may be a terminal that may be electrically connected to the mobile communication device 30. The golf distance measuring device 40 may receive the golf course related information provided from the server 20 through the mobile communication device 30, and then may provide it to the user. Of course, unlike in FIG. 1, the golf distance measuring device 40 may be directly connected to the network 50. In this case, the golf distance measuring device 40 may directly receive the golf course related information provided by the server 20, and may provide it to the user.

In the present embodiment, the golf distance measuring device 40 may be a wearable device, such as a smart watch, a smart band, etc., but the scope of the present invention is not limited thereto.

In the present embodiment, the network 50 may include a wireless network such as a cellular network, a mobile communication network, a WiFi network, and a Bluetooth network, but the scope of the present invention is not limited thereto, and may include a wired network such as a local area network (LAN) and a wide area network (WAN).

The green information measuring apparatus 10 measures current soil information, and transmits the measured soil information to the hole position updating apparatus 12.

The hole position updating apparatus 12 measures a current hole position, and transmits the hole position and the soil information measured by the green information measuring apparatus 10 to the server 20 through the network 50, e.g., a mobile communication network. The server 20 transmits latest soil information and hole position to the mobile communication device 30 through the network 50, and the mobile communication device 30 may provide the latest soil information and hole location to the golf distance measuring device 40 through an app running on a smart phone. When the hole position updating apparatus 12 directly transmits its own GPS position to the server 20, the server 20 may determine the latest hole position by comparing the hole position pre-stored in the server 20 with the GPS position. On the other hand, when the hole position updating apparatus 12 determines the latest hole position by itself by comparing the hole position pre-stored in the hole position update apparatus 12 and the GPS position, the server 20 may consider the GPS position received from the hole position updating apparatus 12 as the latest hole position, and if necessary, may perform a process of additionally verifying whether the GPS position received from the hole position updating apparatus 12 corresponds to the latest hole position.

Since the manager needs to manage a growth condition of turf on the green positioned in each golf course, it is necessary to accurately determine a condition of the soil in which the turf is planted. However, in order to measure a condition of soil planted in a golf course, the manager must directly inspect a large area of the golf course and measure the condition of the soil using a soil property measuring device. Alternatively, it was necessary to indirectly check the condition of the soil inside the golf course by installing the soil property measuring device outside of the golf course that does not interfere with a golf game.

In order to solve such a problem, i.e., in order to provide the manager with accurate current state information of the soil in the golf course, a method may be suggested to implement a device that can detect the condition of the soil at various positions without interfering with the game while being installed directly in the golf course.

However, since the hole cup is positioned on the green in the golf course, there is an environmental restriction that it is difficult to supply power at all times. In the case of receiving power from a battery under such an environmental constraint, when the battery needs to be frequently replaced in a hole or a device positioned near a hole, there is a problem that its practicality is reduced.

In order to further solve such a problem, a method for minimizing power consumption of the green information measuring apparatus 10 is also required.

Figure 2:
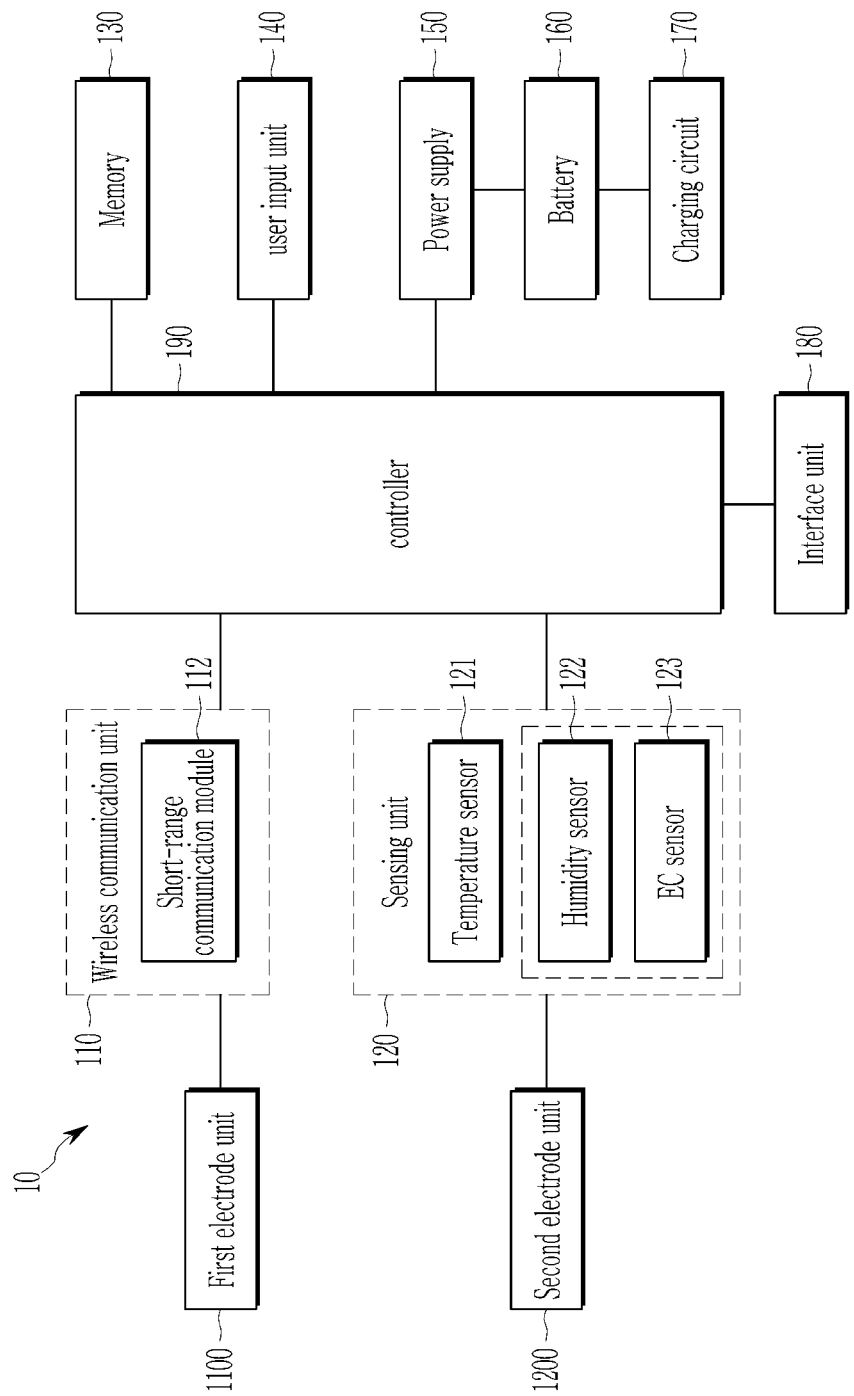
FIG. 2 illustrates a block diagram for describing a green information measuring apparatus according to embodiments.

FIG. 2 illustrates a block diagram for describing a green information measuring apparatus according to embodiments.

Referring to FIG. 2, the green information measuring apparatus 10 according to the embodiments may include a wireless communication unit 110, a sensing unit 120, a memory 130, a user input unit 140, a power supply 150, a battery 160, an interface unit 180, and a controller 190. In addition, the green information measuring apparatus 10 according to the present embodiment may further include a charging circuit 170 depending on whether the battery 160 can be charged.

The wireless communication unit 110 may provide connection to the hole position updating apparatus 12. Specifically, when the controller 190 controls the power supply 150 to supply power to the wireless communication unit 110, the wireless communication unit 110 provides connection with the hole position updating apparatus 12, and when the controller 190 controls the power supply 150 to cut off power to the wireless communication unit 110, the wireless communication unit 110 may be turned off.

In addition, the wireless communication unit 110 may be connected to the first electrode unit 200, and in this case, the first electrode unit 200 may function as an antenna of the wireless communication unit 110.

The wireless communication unit 110 may include a short-range communication module 111 and the like.

The short range communication module 111 is for short range communication, and may support short range communication by using at least one of Bluetooth™, Radio Frequency Identification (RFID), Infrared Data Association (IrDA), Ultra Wideband (UWB), ZigBee, Near Field Communication (NFC), Wi-Fi, Wi-Fi direct, and Wireless Universal Serial Bus (USB) technologies. The short-range communication module 111 may support wireless communication between the green information measuring apparatus 10 and the hole position updating apparatus 12 or between the green information measuring apparatus 10 and the mobile communication device 30 through a wireless area network. The wireless area network may be a wireless personal area network.

Herein, the mobile communication device 30 may be a mobile terminal capable of exchanging (or interworking) data with the green information measuring apparatus 10 according to the embodiments, e.g., a smart phone, a tablet PC, a notebook computer, etc. The short range communication module 111 may detect (or recognize) the hole position updating apparatus 12 or the mobile communication device 30 capable of communicating with the green information measuring apparatus 10 in the vicinity of the green information measuring apparatus 10. Furthermore, when the detected hole position updating apparatus 12 or mobile communication device 30 is a device authenticated to communicate with the green information measuring apparatus 10 according to an embodiment, the controller 190 may transmit at least some of data processed by the green information measuring apparatus 10 to the hole position updating apparatus 12 or the mobile communication device 30 through the short-distance communication module 111.

Accordingly, a user of the mobile communication device 30 may use the data processed by the green information measuring apparatus 10 through the mobile communication device 30.

In addition, the wireless communication unit 110 may operate as a wired communication unit. For example, the flagpole 5 may be electrically coupled to the green information measuring apparatus 10, and the hole position updating apparatus 12 may be electrically coupled to the flagpole 5. In this case, information may be transmitted from the green information measuring apparatus 10 to the hole position updating apparatus 12 through the flagpole 5 by wire.

The sensing unit 120 may include at least one sensor for sensing at least one of environmental information around the green information measuring apparatus 10 or information in the green information measuring apparatus 10. For example, the sensing unit 120 may include a temperature sensor 121, a humidity sensor 122, and an electrical conductivity (EC) sensor 123, and in addition, may include at least one of a sensor for sensing acidity (pH), a battery gauge, a motion sensor, a position acquisition sensor, an infrared sensor, an inclination sensor, a brightness sensor, an altitude sensor, an azimuth sensor, an olfactory sensor, a pressure sensor, a bending sensor, a grip sensor, or a touch sensor. In the meantime, the green information measuring apparatus 10 disclosed in the present specification may utilize a combination of information sensed by at least two or more sensors among the sensors.

The sensing unit 120 may collectively refer to the above-described various sensing means. In addition, the sensing unit 120 may sense various inputs of the user and user environments, and may transfer a sensing result thereof such that the controller 190 may perform an operation according thereto. The above-described sensors may be included in the green information measuring apparatus 10 as a separate element, or may be included as one or more integrated elements.

First, the temperature sensor 121 measures a temperature value of soil and/or a temperature value of a surrounding atmosphere. The temperature sensor 121 may include a thermistor, a thermocouple, a resistance temperature detector (RTD), a bimetal, a state change temperature sensor, a solid state temperature sensor, and the like, but the scope of the present invention is limited thereto. When the temperature sensor 121 is implemented as a contact temperature sensor, the temperature sensor 121 may be coupled to the second electrode unit 210 in contact with the soil to detect a temperature value of the soil.

The humidity sensor 122 may measure humidity of the soil, and the EC sensor 123 may measure electrical conductivity. The humidity sensor 122 and the EC sensor 123 may be integrally configured. The humidity and electrical conductivity of the soil may be detected by measuring electrical characteristics with the humidity sensor 122 and the second electrode unit 210 connected to the EC sensor 123. For example, the humidity sensor 122 and the EC sensor 123 may measure the electrical conductivity and moisture by sequentially measuring impedance by varying a frequency applied to the second electrode unit 210.

As in the case of the wireless communication unit 110, when the controller 190 controls the power supply 150 to supply power to the sensing unit 120, the sensing unit 120 may detect situation information related to an environment around the green information measuring apparatus 10, and when the controller 190 controls the power supply 150 to cut off the power to the sensing unit 120, the sensing unit 120 may be turned off.

In addition, the memory 130 stores data supporting various functions of the green information measuring apparatus 10. The memory 130 may store firmware and an application program driven in the green information measuring apparatus 10 and data and commands for an operation of the green information measuring apparatus 10. At least some of application programs may be installed in the green information measuring apparatus 10 at the time of shipment for the basic function of the green information measuring apparatus 10. Further, at least some of the application programs may be downloaded from an external server through wireless communication. In the meantime, the application program may be stored in the memory 130 and is installed in the green information measuring apparatus 10, thereby being driven so as to perform the operation (or the function) of the green information measuring apparatus 10 by the controller 190.

The memory 130 may store current green information (e.g., measured temperature, humidity, electrical conductivity, etc. of green soil) (hereinafter referred to as "green information"), and may also store a history of current green information. The wireless communication unit 110 may immediately transmit the current green information stored in the memory 130 to the hole position updating apparatus 12, or may transmit the history information stored in the memory 130 to the hole position updating apparatus 12.

Next, the user input unit 140 receives input of information from a user, and when information is input through the user input unit 140, the controller 190 may control an operation of the green information measuring apparatus 10 so as to correspond to the input information. The user input unit 140 may include a mechanical input means (for example, a mechanical key, a button positioned on a front surface, a rear surface, or a lateral surface of the green information measuring apparatus 10, a dome switch, a jog wheel, and a jog switch) and a touch-type input means.

The power supply 150 may supply power to the controller 190, the wireless communication unit 110, and the sensing unit 120 under the control of the controller 190. The power supply 150 may receive power from the battery 160.

In some embodiments of the present invention, the green information measuring apparatus 10 may further include a charging circuit 170. For example, when the battery 160 of the green information measuring apparatus 10 is implemented as a rechargeable battery, e.g., a secondary battery, the charging circuit 170 may charge the battery 160.

Meanwhile, in some embodiments of the present invention, when the battery 160 of the green information measuring apparatus 10 is implemented as a non-rechargeable battery, e.g., a primary battery, the green information measuring apparatus 10 may omit the charging circuit 170.

The interface unit 180 serves as a passage of various kinds of external devices connected with the green information measuring apparatus 10. The interface unit 180 may include at least one of an external charger port, a wired/wireless data port, or a memory card port. The green information measuring apparatus 10 may perform appropriate control related to the connected external device in response to the connection of the external device to the interface unit 180.

The controller 190 controls an overall operation of the green information measuring apparatus 10. The controller 190 may be implemented as a processing circuit such as a microprocessor, a central processing unit (CPU), or an application processor (AP), but the scope of the present invention is not limited thereto. The controller 190 may execute software or a program that implements a function of the green information measuring apparatus 10.

The controller 190 may operate in a power cut-off mode by default, but may escape from the power cut-off mode in response to a wake-up signal, may measure the current green information, and may then enter the power cut-off mode again. When the controller 190 escapes from the power cut-off mode in response to the wake-up signal and measures the current green information, the controller 190 supplies power to the temperature sensor 121, the humidity sensor 122, the EC sensor 123, and the wireless communication unit 110 in response to the wake-up signal, receives the temperature, humidity, and electrical conductivity of the soil from each of the temperature sensor 121, the humidity sensor 122, and the EC sensor 123, and transmits data of the temperature, humidity, and electrical conductivity of the soil to the hole position updating apparatus 12 using the wireless communication unit 110. After transmitting the data of the temperature, humidity, and electrical conductivity of the soil to the hole position updating apparatus 12, the controller 190 may enter the power cut-off mode.

In this specification, the "power off mode" refers to a state in which power supply to most components of the green information measuring apparatus 10 is cut off and/or power supply to most components of the hole position updating apparatus 12 is cut off. In other words, when the green information measuring apparatus 10 and/or the hole position updating apparatus 12 enters the power-off mode, power supply to all components except for a circuit (wake-up signal detection circuit) that must always be operated to detect the "wake-up signal" may be cut off.

In the present specification, the "wake-up signal" indicates a signal for escaping the green information measuring apparatus 10 and/or the hole position updating apparatus 12, which has entered the power cut-off mode, from the power cut-off mode. In the present specification, the "wake-up mode" refers to an operation mode in which the green information measuring apparatus 10 and/or the hole position updating apparatus 12 escapes from the power cut-off mode. In the wake-up mode, power supply to all components of the green information measuring device 10 and/or the hole position updating device 12 does not need to be guaranteed, and even in the wake-up mode, power supply may be provided for some components only and power supply may be cut off for some other components as needed.

The controller 190 may further include a counter. In addition, the wake-up signal may be generated when a value of the counter reaches a predetermined value. When the value of the value reaches a first value, the controller 190 may generate a first wake-up signal that operates the sensing unit 120 to measure soil information. When the value of the counter reaches a second value, the controller 190 may generate a second wake-up signal for operating the wireless communication unit 110 to transmit soil information.

The green information measuring apparatus 10 installed on a green in a golf course where it is difficult to supply power at all times may stably operate for several months without the need for battery replacement by using a method of maintaining the power cut-off mode by default, escaping from the power cut-off mode only when a predetermined time elapses, updating the current green information, and then entering the power cut-off mode again.

In particular, the controller 190 may control the power supply 150 to supply or cut off power to at least one of the controller 190 itself, the wireless communication unit 110, or the sensing unit 120. The controller 190 may include a wake-up signal detection circuit that should always operate in order to detect the above-described wake-up signal, and when operating in the power cut-off mode, power supply to the controller 190 itself, the wireless communication unit 110, and the sensing unit 120 except for the wake-up signal detection circuit may be cut off.

The controller 190 may calculate salinity of the soil using the measured electrical conductivity, humidity, and temperature. Since the electrical conductivity of the soil has a close relationship with the moisture of the soil, the controller 190 corrects an electrical conductivity (EC) measurement value, which is highly dependent on temperature and soil moisture, with respect to temperature and soil moisture, so that more reliable electrical conductivity can be calculated and used to calculate salinity. In addition, the controller 190 may mutually correct each of the measured measurement items using related measurement items.

Next, a structure of the green information measuring apparatus 10 will be described with reference to FIG. 3 to FIG. 9.

Figure 3:
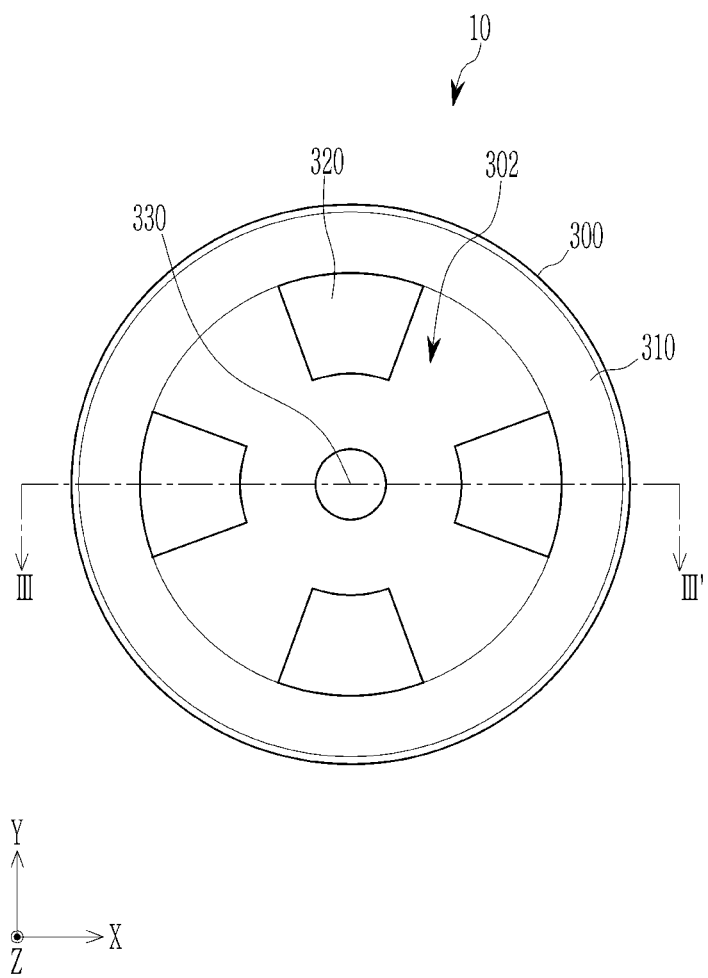
FIG. 3 illustrates a top plan view of a green information measuring apparatus according to embodiments.

FIG. 3 illustrates a top plan view of a green information measuring apparatus according to embodiments.

As illustrated in FIG. 3, the green information measuring apparatus 10 may include a housing 300, and the housing 300 may include an inner space 310, at least one drain 320, and a flagpole coupling portion 330.

The housing 330 may be made of an insulating material such as plastic. The housing 300 has a receiving space 302 capable of receiving a golf ball. After the golf ball enters the green information measuring apparatus 10, the golf ball is positioned in the receiving space 302. The housing 300 may have a cylindrical shape, a polygonal shape, a column shape having at least part of a shape of a curved surface, an entasis shape, a frustum of a pyramid shape, a circular truncated cone shape, or the like, of which at least one of upper or lower surfaces is open, but it is not limited thereto.

It may have an inner space 310 in which a battery 160 for supplying power to the green information measuring device 10 is positioned inside the housing 300, i.e., at a portion surrounded by an inner surface that is not exposed to the outside, in addition to various units, modules, circuits, and sensor devices described in FIG. 2. The housing 300 is configured to waterproof the inner space 310 in which an electronic module or electronic device is positioned in consideration of characteristics of the green information measuring apparatus 10 installed outdoors.

At least one drain 320 is configured to extend through the housing 300. The drain 320 may drain water accumulated in the receiving space 302 to prevent water from pooling in the receiving space 302.

The flagpole coupling portion 330 provides coupling of the green information measuring apparatus 10 and the flagpole 5. An end of the flagpole 5 may be inserted in the flagpole coupling portion 330 to be fixed therein.

The battery 160 may be manufactured to have a shape that matches the appearance of the housing 300, but the scope of the present invention is not limited thereto.

Figure 4:
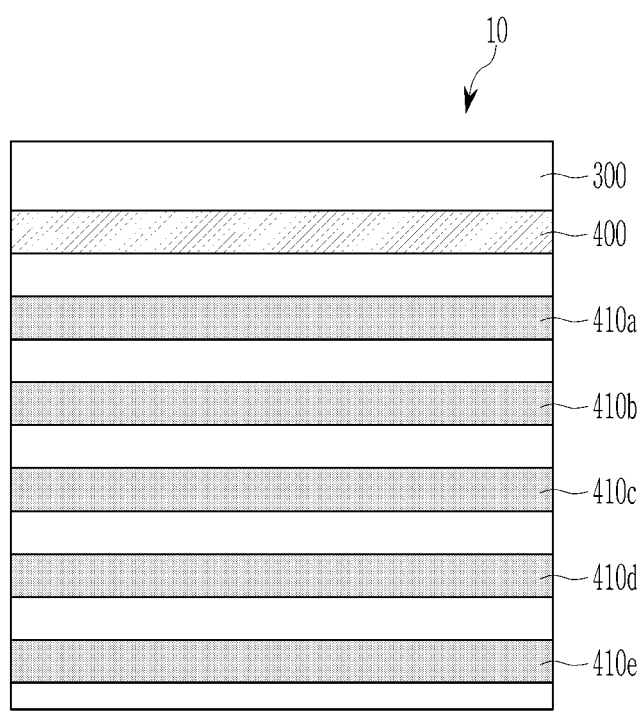
FIG. 4 illustrates a front view of a green information measuring apparatus according to a first embodiment.
Figure 5:
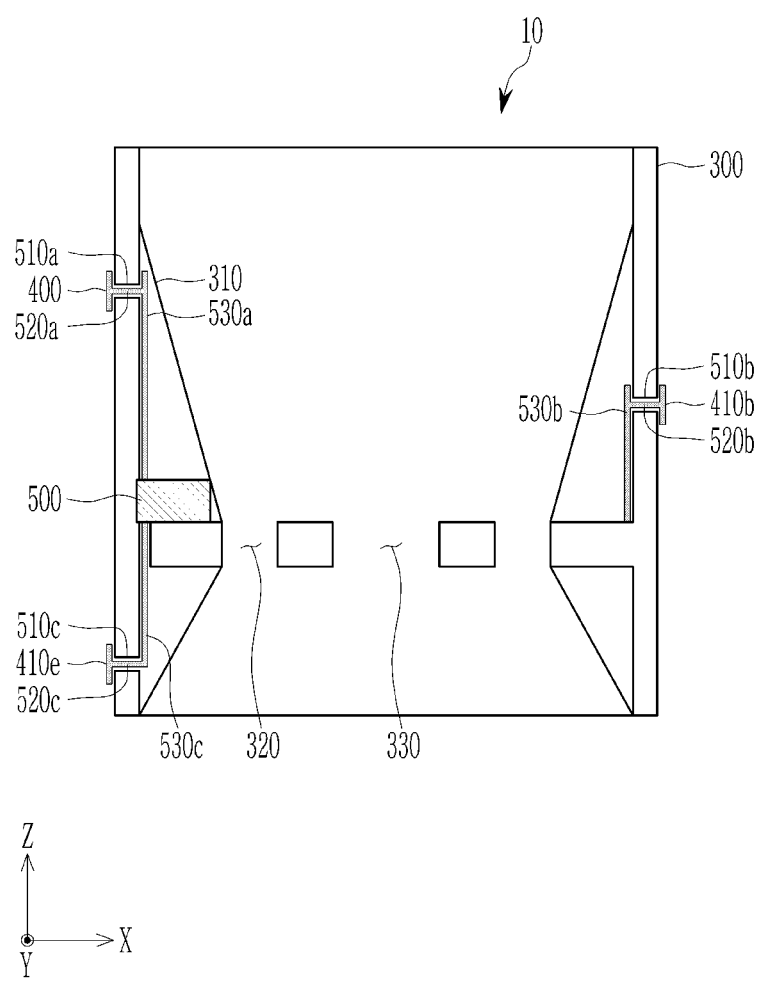
FIG. 5 illustrates a cross-sectional view of the green information measuring apparatus according to the first embodiment taken along a line III-III' of FIG. 3.

FIG. 4 illustrates a front view of a green information measuring apparatus according to a first embodiment, and FIG. 5 illustrates a cross-sectional view of the green information measuring apparatus according to the first embodiment taken along a line III-III' of FIG. 3.

As illustrated in FIG. 4, a plurality of electrodes 400, 410a, 410b, 410c, 410d, and 410e may be positioned on an outer surface of the housing 300. The electrodes 400, 410a, 410b, 410c, 410d, and 410e may extend along an X-axis, and may be arranged along a Z-axis. The electrodes 400, 410a, 410b, 410c, 410d, and 410e may be printed on a sheet by a method such as plating, photolithography, thin film sputtering, etc. to be attached to the outer surface of the housing 300, or may be directly formed on the surface of the housing 300 by plating, photolithography, thin film deposition, or the like, and a method for positioning the electrodes 400, 410a, 410b, 410c, 410d, and 410e on the surface of the housing is not limited to the above method.

Among the electrodes 400, 410a, 410b, 410c, 410d, and 410e, the electrode 400 positioned at the upper end along the Z-axis may function as the first electrode unit 200 coupled to the wireless communication unit 110.

The electrode 400 may be positioned on an inner surface of the housing 300, i.e., a region where the receiving space 302 is positioned. The electrode 400 may be positioned on an upper surface of the housing 300. In this case, even when the green information measuring apparatus 10 is inserted into the green, the electrode 400 positioned on the upper surface or the electrode 400 positioned on the inner surface is exposed to the outside, so that it can function as an antenna electrode having a more excellent characteristic.

The electrodes 410a, 410b, 410c, 410d, and 410e may function as the second electrode unit 210 coupled to the temperature sensor 121, the humidity sensor 122, and/or the EC sensor 123. For example, the temperature sensor 121 may measure the temperature of the soil in contact with each of the electrodes 410a, 410b, 410c, 410d, and 410e, and the humidity sensor 122 and the EC sensor 123 may measure impedance between two of the electrodes 410a, 410b, 410c, 410d, and 410e to detect humidity and electrical conductivity.

The electrodes 410a, 410b, 410c, 410d, and 410e are positioned on the outer surface of the housing to be in direct contact with the soil. The electrodes 410a, 410b, 410c, 410d, and 410e may be spaced apart from each other along the Z-axis direction, and the electrodes 410a, 410b, 410c, 410d, and 410e may each be used to measure temperature, humidity, and/or electrical conductivity depending on a depth in the Z-axis direction. For example, the electrode 410a can be used to measure the temperature of the soil at a depth of 2 cm from the ground surface, and the electrode 410e may be used to measure the temperature of the soil at a depth of 10 cm from the ground surface. In addition, electrodes 410a and 410b may be used to measure the humidity and/or electrical conductivity of the soil at a depth of 2 cm to 4 cm from the ground surface, and electrodes 410d and 410e may be used to measure humidity and/or electrical conductivity at a depth of 8 cm to 10 cm from the ground surface.

As illustrated in FIG. 5, the at least one drain hole 320 and the flagpole coupling portion 330 are formed in the housing 300.

In addition, an electronic device 500 including various units, modules, circuits, sensor devices, batteries, and the like described in FIG. 2 may be positioned in the inner space 310 of the housing 300.

In the electronic device 500, the electrodes 400, 410a, 410b, 410c, 410d, and 410e positioned on the outer or inner surface of the housing 300 are electrically connected to each other. To this end, the housing 300 may have one or more openings 510a, 510b, and 510c. Herein, the openings 510a, 510b, and 510c may each be referred to as a contact hole, a via hole, a through hole, an opening, a hole, or the like, which physically connects the outer or inner surface of the housing 300 and the inner space 310 of the housing 300.

Then, the electrodes 400, 410a, 410b, 410c, 410d, and 410e may be electrically connected to the electronic device 500 through the openings 510a, 510b, and 510c. For example, a wire 530a connected to the electronic device 500 and extending to the opening 510a is positioned on the surface of the inner space 310 of the housing 300. The electrode 400 contacts a wire 520a positioned in the opening 510a, and the wire 530a also contacts the wire 520a positioned in the opening 510a. Then, the electrode 400, the wire 520a positioned in the opening 510a, and the wiring 530a may be electrically connected to each other. In the above, a material of the electrode 400, the wire 520a positioned in the opening 510a, and the wire 530a may include a same conductive material as or different conductive materials from each other, and at least two components of the electrode 400, the wire 520a positioned in the opening 510a, and the wire 530a may be integrally formed, but a scope of the present invention is not limited thereto.

Similarly, the electrode 410b, the wire 520b positioned in the opening 510b, and the wire 530b may be electrically connected to each other, and the electrode 410e, the wire 520c positioned in the opening 510c, and the wire 530c may be electrically connected to each other.

In the above description, the electrodes 400, 410b, and 410e have been described as being respectively connected to the wires 530a, 530b, and 530c positioned in the inner space through the corresponding openings 510a, 520b, and 520c, but the electrodes 400, 410a, 410b, 410c, 410d, and 410e may be electrically connected to wires positioned in the inner space so as to not contact each other through one opening.

Figure 6:
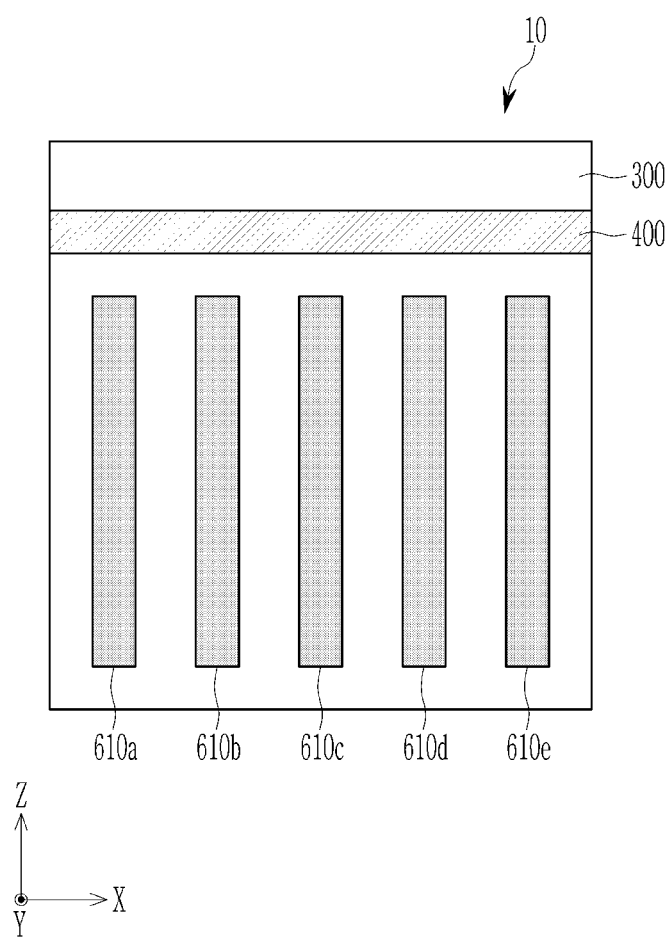
FIG. 6 illustrates a front view of a green information measuring apparatus according to a second embodiment.
Figure 7:
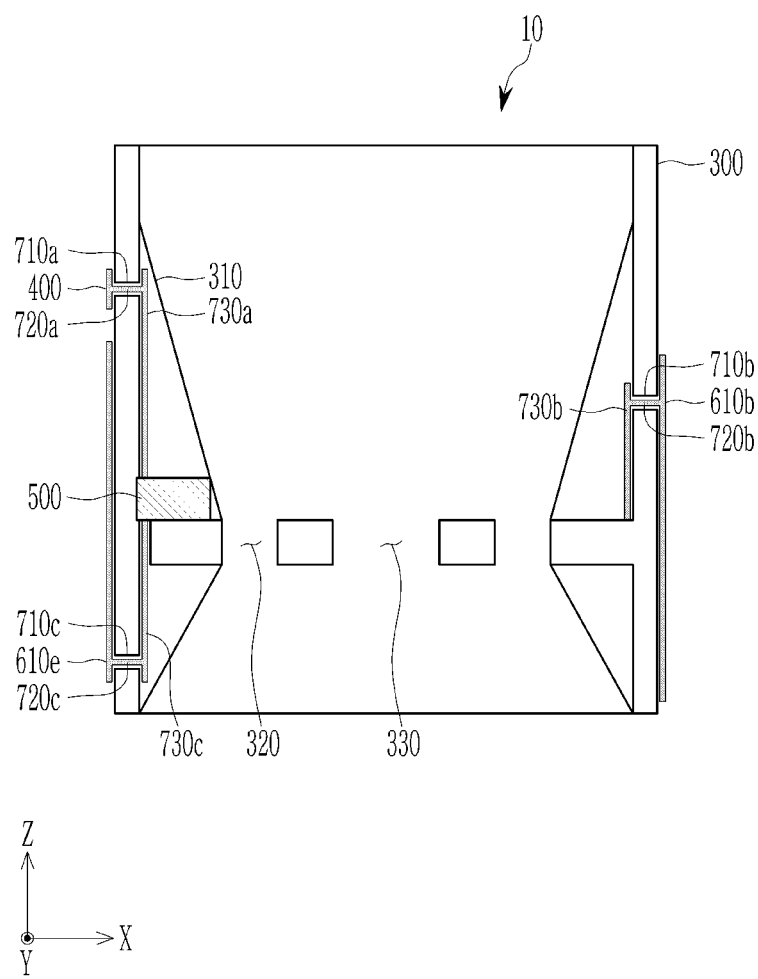
FIG. 7 illustrates a cross-sectional view of the green information measuring apparatus according to the second embodiment taken along a line III-III' of FIG. 3.

FIG. 6 illustrates a front view of a green information measuring apparatus according to a second embodiment, and FIG. 7 illustrates a cross-sectional view of the green information measuring apparatus according to the second embodiment taken along a line III-III' of FIG. 3. In descriptions of the present embodiment, descriptions of the same and similar contents as those of the first embodiment will be omitted.

As illustrated in FIG. 6, a plurality of electrodes 400, 610a, 610b, 610c, 610d, and 610e may be positioned on an outer surface of the housing 300. The electrode 400 positioned at the upper end extends along the X-axis, and may function as the first electrode unit 200 coupled to the wireless communication unit 110.

The electrodes 610a, 610b, 610c, 610d, and 610e may extend along the Z-axis, and may be arranged along the X-axis. The electrodes 400, 610a, 610b, 610c, 610d, and 610e may be printed on a sheet by a method such as plating, photolithography, thin film sputtering, etc. to be attached to the outer surface of the housing 300, or may be directly formed on the surface of the housing 300 by plating, photolithography, thin film deposition, or the like, and a method for positioning the electrodes 400, 610a, 610b, 610c, 610d, and 610e on the surface of the housing is not limited to the above method.

The electrodes 610a, 610b, 610c, 610d, and 610e may function as the second electrode unit 210 coupled to the temperature sensor 121, the humidity sensor 122, and/or the EC sensor 123. For example, the temperature sensor 121 may measure the temperature of the soil in contact with each of the electrodes 610a, 610b, 610c, 610d, and 610e, and the humidity sensor 122 and the EC sensor 123 may measure impedance between two of the electrodes 610a, 610b, 610c, 610d, and 610e to detect humidity and electrical conductivity.

The electrodes 610a, 610b, 610c, 610d, and 610e are positioned on the outer surface of the housing to be in direct contact with the soil. The electrodes 610a, 610b, 610c, 610d, and 610e are spaced apart from each other along the X-axis direction. The electrodes 610a, 610b, 610c, 610d, and 610e may be used to measure the temperature, humidity, and/or electrical conductivity of soil around the green information measuring apparatus 10. When the temperature, humidity, and/or electrical conductivity measured by some electrodes is not similar to the temperature, humidity, and/or electrical conductivity measured using some other electrodes, the controller 190 determines that some of the electrodes 610a, 610b, 610c, 610d, and 610e are not in contact with the soil, and only temperature, humidity, and/or electrical conductivity measured using other partial electrodes are used as soil information.

Some other electrodes may be used to measure temperature, humidity, and/or electrical conductivity.

As illustrated in FIG. 7, in the electronic device 500, the electrodes 400, 610a, 610b, 610c, 610d, and 610e positioned on the outer or inner surface of the housing 300 are electrically connected to each other. To this end, the housing 300 may have one or more openings 710a, 710b, and 710c.

Then, the electrodes 400, 610a, 610b, 610c, 610d, and 610e may be electrically connected to the electronic device 500 through the openings 710a, 710b, and 710c. For example, a wire 730a connected to the electronic device 500 and extending to the opening 710a is positioned on the surface of the inner space 310 of the housing 300. The electrode 400 contacts a wire 720a positioned in the opening 710a, and the wire 730a also contacts the wire 720a positioned in the opening 710a. Then, the electrode 400, the wire 720a positioned in the opening 710a, and the wiring 730a may be electrically connected to each other. In the above, a material of the electrode 400, the wire 720a positioned in the opening 710a, and the wire 730a may include a same conductive material as or different conductive materials from each other, and at least two components of the electrode 400, the wire 720a positioned in the opening 710a, and the wire 730a may be integrally formed, but a scope of the present invention is not limited thereto.

Similarly, the electrode 610b, the wire 720b positioned in the opening 710b, and the wire 730b may be electrically connected to each other, and the electrode 610e, the wire 720c positioned in the opening 710c, and the wire 730c may be electrically connected to each other.

In the above description, the electrodes 400, 610b, and 610e have been described as being respectively connected to the wires 730a, 730b, and 730c positioned in the inner space through the corresponding openings 710a, 720b, and 720c, but the electrodes 400, 610a, 610b, 610c, 610d, and 610e may be electrically connected to wires positioned in the inner space so as to not contact each other through one opening.

Figure 8:
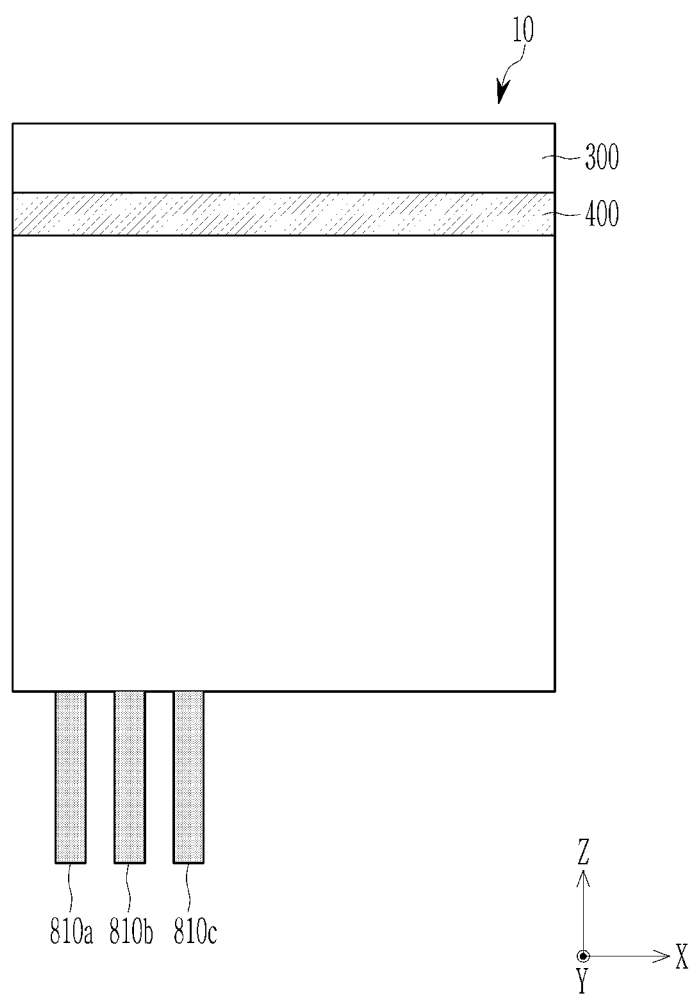
FIG. 8 illustrates a front view of a green information measuring apparatus according to a third embodiment.
Figure 9:
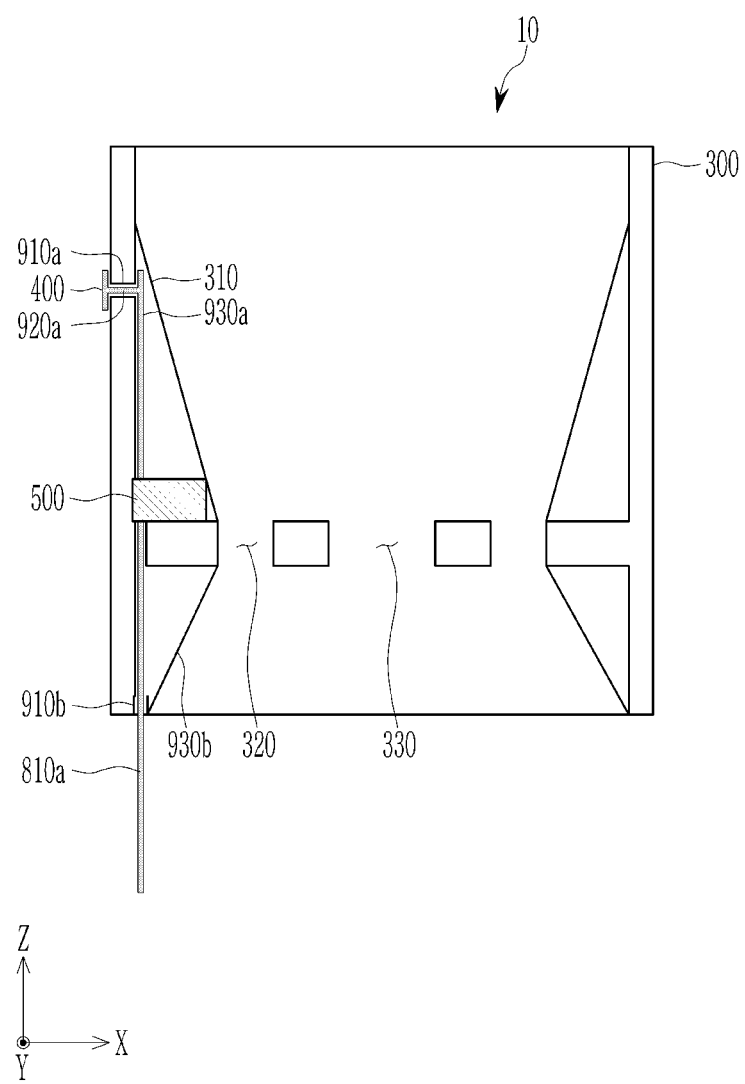
FIG. 9 illustrates a cross-sectional view of the green information measuring apparatus according to the third embodiment taken along a line III-III' of FIG. 3.

FIG. 8 illustrates a front view of a green information measuring apparatus according to a third embodiment, and FIG. 9 illustrates a cross-sectional view of the green information measuring apparatus according to the third embodiment taken along a line III-III' of FIG. 3. In descriptions of the present embodiment, descriptions of the same and similar contents as those of the first and second embodiments will be omitted.

As illustrated in FIG. 8, the electrode 400 may be positioned on the outer surface of the housing 300, and a plurality of electrodes 810a, 810b, and 810c may be positioned under the housing 300. The electrode 400 positioned at the upper end extends along the X-axis, and may function as the first electrode unit 200 coupled to the wireless communication unit 110. The electrode 400 may be printed on a sheet by a method such as plating, photolithography, thin film sputtering, etc. to be attached to the outer surface of the housing 300, or may be directly formed on the surface of the housing 300 by plating, photolithography, thin film deposition, or the like, and a method for positioning the electrode 400 on the surface of the housing is not limited to the above method.

The electrodes 810*a*, 810*b*, and 810*c* may extend along the Z-axis, and may be arranged under the housing 300 along the X-axis. The electrodes 810*a*, 810*b*, and 810*c* may be fixedly coupled to the housing 300. The electrodes 810*a*, 810*b*, and 810*c* may extend into the housing 300. The electrodes 810*a*, 810*b*, and 810*c* may be directly inserted into the soil to be in direct contact with the soil.

The electrodes 810*a*, 810*b*, and 810*c* may function as the second electrode unit 210 coupled to the temperature sensor 121, the humidity sensor 122, and/or the EC sensor 123. For example, the temperature sensor 121 may measure the temperature of the soil in contact with each of the electrodes 810*a*, 810*b*, and 810*c*, and the humidity sensor 122 and the EC sensor 123 may measure impedance between two of the electrodes 810*a*, 810*b*, and 810*c* to detect humidity and electrical conductivity.

Next, the hole position updating apparatus 12 will be described with reference to FIG. 10 and FIG. 11.

Figure 10:
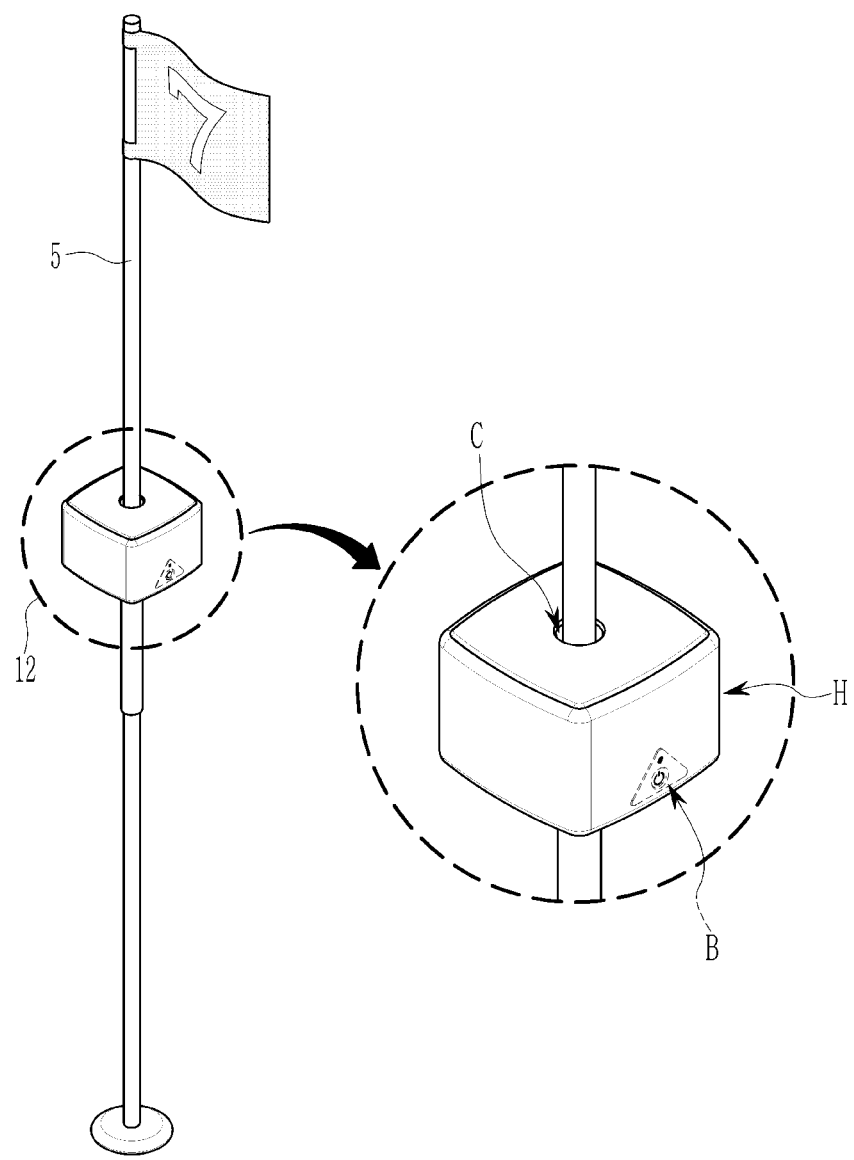
FIG. 10 illustrates a schematic diagram for describing a hole position updating apparatus according to an embodiment.

FIG. 10 illustrates a schematic diagram for describing a hole position updating apparatus according to an embodiment.

A golfer needs to accurately determine a remaining distance from a position of the golfer to a hole. However, a position of the hole may be changed from time to time for, e.g., green management of a golf course, difficulty adjustment of the golf course, and the like. For convenience, a method of providing the golfer with a distance to a center of a green or providing the golfer with the distance to a designated point when the golfer directly designates a changed hole position, strictly speaking, does not provide the golfer with a correct hole position.

In order to solve such a problem, that is, to provide the golfer with the accurate hole position, a method of implementing a device capable of detecting a position in a hole or near the hole may be suggested. That is, as illustrated in FIG. 10, since the flagpole 5 is installed on a hole cup, the hole position updating apparatus 10 capable of detecting a hole position in a form of being coupled to the flagpole 5 may be considered.

However, since the hole is positioned on the green in the golf course, there is an environmental restriction that it is difficult to supply power at all times. In the case of receiving power from a battery under such an environmental constraint, when the battery needs to be frequently replaced in a hole or a device positioned near a hole, there is a problem that its practicality is reduced.

In order to further solve such a problem, a method for minimizing power consumption of the hole position updating apparatus 10 is also required.

Referring to FIG. 10, the hole position updating apparatus 12 may be implemented in a form of being coupled to the flagpole 5.

The hole position updating apparatus 12 has a housing H, and the housing H may include at least one button B and a flagpole coupling portion C. In addition, the battery 160 for supplying power to the hole position updating apparatus 12 may be included inside the housing H.

As illustrated in FIG. 10, at least one button B may be positioned at a lower portion of the housing H such that only a manager (e.g., a greenkeeper) can press it. Of course, a position of the at least one button B is not limited thereto, and it may be disposed at any point of the housing H depending on a specific implementation purpose.

When the manager puts the flagpole 5 into a changed hole and presses the at least one button B, the hole position updating apparatus 12, which was in a power cut-off mode, may enter a wake-up mode to measure a current hole position, may receive current green information from the green information measuring apparatus 10, and may transmit at least one of the measured hole position or the current green information to the server 20 through the network 50. After transmitting at least one of the measured hole position or the current green information to the server 20, the hole position updating apparatus 12 may enter the power-off mode again.

The hole position updating apparatus 12 installed on a green in a golf course where it is difficult to supply power at all times may stably operate for several months without the need for battery replacement by using a method of maintaining the power cut-off mode by default, escaping from the power cut-off mode only when there is a change in the hole position and the manager presses the at least one button B, updating the current hole position, and then entering the power cut-off mode again.

The flagpole coupling portion C provides coupling of the hole position updating apparatus 12 and the flagpole 5. In general, a thickness of the flagpole 5 may become thicker as it goes downward, and the flagpole coupling portion C may have such a thickness so as for the hole position updating apparatus 12 to be firmly fixed to the flagpole 5 of the varying thickness as described above. For example, the flagpole coupling portion C may be formed to have a cylindrical shape that gradually becomes wider as it goes down, and may be implemented in various ways, such as including an additional component for pressing and fixing the flagpole 5 in the left and right directions.

The battery 160 may be manufactured to have a shape that matches the appearance of the housing H, but the scope of the present invention is not limited thereto.

Figure 11:
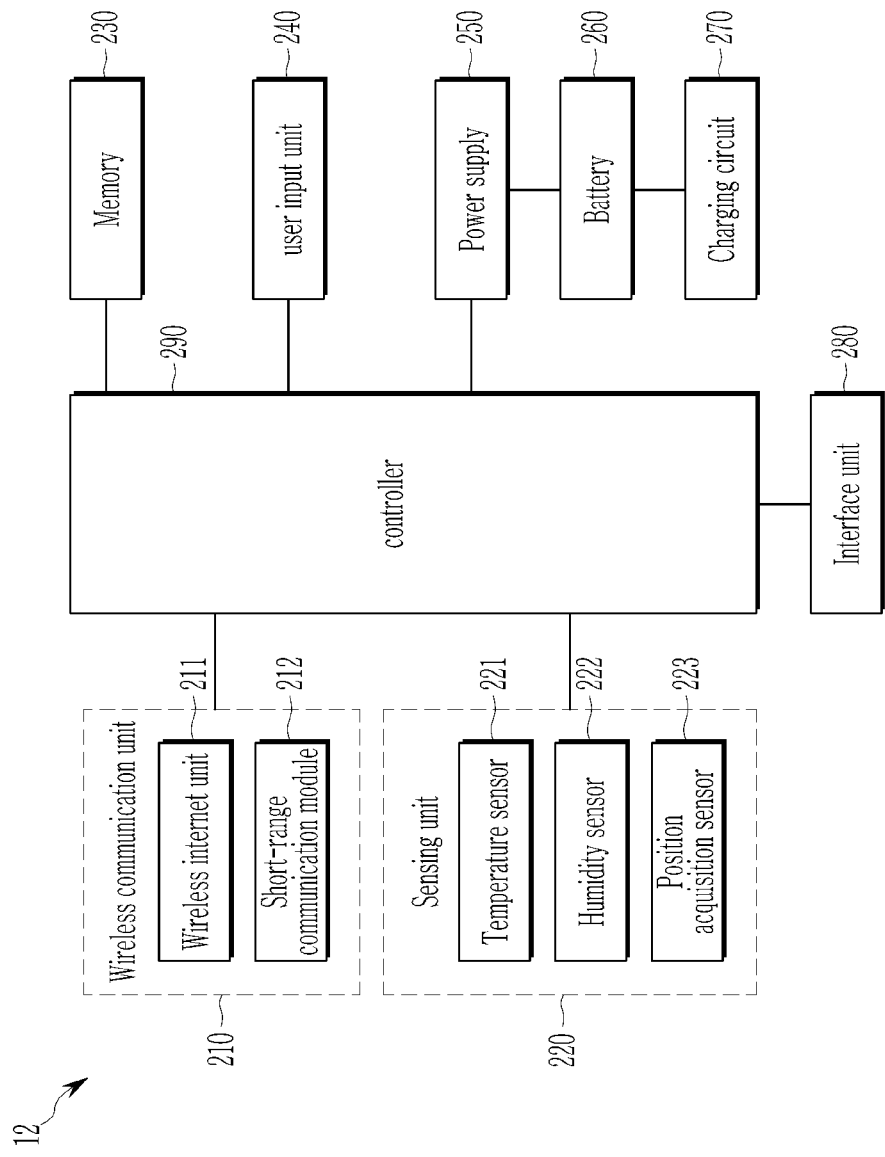
FIG. 11 illustrates a block diagram for describing a hole position updating apparatus according to an embodiment.

FIG. 11 illustrates a block diagram for describing a hole position updating apparatus according to an embodiment.

Referring to FIG. 11, the hole position updating apparatus 12 according to the embodiments may include a wireless communication unit 110, a sensing unit 120, a memory 130, a user input unit 140, a power supply 150, a battery 160, an interface unit 180, and a controller 190. In addition, the hole position updating apparatus 12 according to the present embodiment may further include a charging circuit 170 depending on whether the battery 160 can be charged.

The wireless communication unit 210 may provide connection to the server 20 through the network 50, e.g., a mobile communication network. Specifically, when the controller 290 controls the power supply 250 to supply power to the wireless communication unit 210, the wireless communication unit 210 may provide connection with the server 20 through the network 50, may provide connection with the green information measuring apparatus 10, and when the controller 290 controls the power supply 250 to cut off power to the wireless communication unit 210, the wireless communication unit 210 may be turned off.

The wireless communication unit 210 may include a wireless Internet module 211 and a short range communication module 212.

The wireless Internet module 211 refers to a module for wireless Internet connection, and may be embedded in the hole position updating apparatus 22. The wireless Internet module 211 is configured to transmit and receive wireless signals in a communication network according to wireless Internet technologies. The wireless Internet module 211 transceives a wireless signal in a communication network according to the wireless Internet technologies. Examples of the wireless Internet technology include a Wireless Local Area Network (WLAN), Wireless Fidelity (Wi-Fi), Wi-Fi Direct, Digital Living Network Alliance (DLNA), Wireless Broadband (WiBro), World Interoperability for Microwave Access (WiMAX), High Speed Downlink Packet Access (HSDPA), High Speed Uplink Packet Access (HSUPA), Long Term Evolution (LTE), Long Term Evolution-Advanced (LTE-A), and New Radio (NR), and the wireless Internet module 171 transceives data according to at least one wireless Internet technology in a range including Internet technology which is not listed above.

The short range communication module 212 is for short range communication, and may support short range communication by using at least one of Bluetooth™, Radio Frequency Identification (RFID), Infrared Data Association (IrDA), Ultra Wideband (UWB), ZigBee, Near Field Communication (NFC), Wi-Fi, Wi-Fi direct, and Wireless Universal Serial Bus (USB) technologies. The short-distance communication module 212 may support wireless communication between the hole position updating apparatus 12 and the green information measuring apparatus 10, between the hole position updating apparatus 12 and the wireless communication system, between the hole position updating apparatus 12 and the mobile communication device 30, or between the hole position updating apparatus 12 and a network where the server 20 is positioned. The wireless area network may be a wireless personal area network.

The sensing unit 220 may include at least one sensor for sensing at least one piece of environmental information around the hole position updating apparatus 12 or information in the hole position updating apparatus 12. For example, the sensing unit 220 may include a temperature sensor 221, a motion detection sensor 222, and a position acquisition sensor 223, and in addition, may include at least one of a battery gauge, an infrared sensor, an inclination sensor, a brightness sensor, an altitude sensor, an azimuth sensor, an olfactory sensor, a pressure sensor, a bending sensor, a grip sensor, or a touch sensor. In the meantime, the hole position updating apparatus 12 disclosed in the present specification may utilize a combination of information sensed by at least two or more sensors among the sensors.

The sensing unit 220 may collectively refer to the above-described various sensing means. In addition, the sensing unit 220 may sense various inputs of the user and user environments, and may transfer a sensing result thereof such that the controller 290 may perform an operation according thereto. The above-described sensors may be included in the hole position updating apparatus 12 as a separate element, or may be included as one or more integrated elements.

First, the temperature sensor 221 measures a temperature value of a surrounding atmosphere. The temperature sensor 221 may include a thermistor, a thermocouple, a resistance temperature detector (RTD), a bimetal, a state change temperature sensor, a solid state temperature sensor, and the like, but the scope of the present invention is limited thereto.

The motion detection sensor 222 may include an acceleration sensor, and/or a gyroscope sensor.

The acceleration sensor may acquire a degree of tilt of the hole position updating apparatus 12. The acceleration sensor may include an accelerometer measuring gravitational acceleration. Further, the acceleration sensor may also be implemented by a scheme of calculating a tilt by using a rotation angle in a vertical direction from a predetermined reference direction acquired by a gyro sensor, and the like.

In addition, the gyroscope sensor may detect a three-dimensional movement of the information measuring apparatus 20.

The motion detection sensor 222 may be continuously supplied with power from the power supply unit 250. The motion detection sensor 222 may transfer a wake-up signal to the controller 290 when detecting a movement of the hole position updating apparatus 12. Then, the controller 290 controls the power supply unit 250 to supply power to the wireless communication unit 210, the temperature sensor 221, and the position acquisition sensor 224, the temperature sensor 221 detects the temperature information around the hole position updating apparatus 12, the position acquisition sensor 223 detects a position of the hole, and the wireless communication unit 210 may transmit detected information to the server 20. This sensing and transmission operation may be performed when the motion detection sensor 222 detects a movement of the hole position updating apparatus 12 and then determines that the movement of the hole position updating apparatus 12 is stopped. When there is no movement of the hole position updating apparatus 12 measured by the motion detection sensor 222 for a predetermined period, it may be determined that the movement of the hole position updating apparatus 12 is stopped.

The position acquiring sensor 223 is a sensor for acquiring a position of the hole position updating apparatus 12, and a representative example of the position acquiring sensor 112 is a global positioning system (GPS) sensor. The GPS sensor calculates distance information from three or more separate satellites and accurate time information and then applies trigonometry to the calculated information, thereby accurately calculating 3D current position information according to the latitude, the longitude, and the altitude. Currently, a method of calculating position and time information by using three satellites and correcting errors of the calculated position and time information by using one other satellite is widely used. Further, the GPS sensor may calculate speed information by continuously calculating a current position in real time. The GPS sensor may include a GPS communication chip capable of communicating with a satellite to receive coordinates of a GPS position.

As in the case of the wireless communication unit 210, when the controller 290 controls the power supply 250 to supply power to the sensing unit 220, the sensing unit 220 may detect position information or situation information related to an environment around the hole position updating apparatus 12, and when the controller 290 controls the power supply 250 to cut off the power to the sensing unit 220, the sensing unit 220 may be turned off.

In addition, the memory 230 stores data supporting various functions of the hole position updating apparatus 12. The memory 230 may store firmware and an application program driven in the hole position updating apparatus 12 and data and commands for an operation of the hole position updating apparatus 12. At least some of the application programs may be installed in the hole position updating apparatus 12 at the time of shipment for the basic function of the hole position updating apparatus 12. Further, at least some of the application programs may be downloaded from an external server through wireless communication. In the meantime, the application program may be stored in the memory 230 and is installed in the hole position updating apparatus 12, thereby being driven so as to perform the operation (or the function) of the hole position updating apparatus 12 by the controller 290.

The memory 230 may store position information for a golf course. For example, the memory 230 may store GPS position information for a corresponding golf course, e.g., a fairway, a green area, and the like. In addition, the memory 230 may store the current green information received from the green information measuring apparatus 10, the temperature around the green measured by the temperature sensor 221, and the hole position measured by the position acquisition sensor 223, and may store the current green information, the temperature around the green, and the history of the hole position. The wireless communication unit 210 may immediately transmit the current green information stored in the memory 230, transmit the temperature and the hole position around the green to the server 20, or may transmit the history information stored in the memory 230 to the server 20.

Next, the user input unit 240 receives input of information from a user, and when information is input through the user input unit 240, the controller 290 may control an operation of the hole position updating apparatus 12 so as to correspond to the input information. The user input unit 240 may include a mechanical input means (for example, a mechanical key, a button positioned on a front surface, a rear surface, or a lateral surface of the hole position updating apparatus 12, a dome switch, a jog wheel, and a jog switch) and a touch-type input means.

The power supply 250 may supply power to the controller 290, the wireless communication unit 210, the sensing unit 220, and the GPS circuit 230 under the control of the controller 290. The power supply 250 may receive power from the battery 260.

In some embodiments of the present invention, the hole position updating apparatus 12 may further include a charging circuit 270. For example, when the battery 260 of the hole position updating apparatus 12 is implemented as a rechargeable battery, e.g., a secondary battery, the charging circuit 270 may charge the battery 260.

Meanwhile, in some embodiments of the present invention, when the battery 260 of the hole position updating apparatus 12 is implemented as a non-rechargeable battery, e.g., a primary battery, the hole position updating apparatus 12 may omit the charging circuit 270.

The interface unit 280 serves as a passage of various kinds of external devices connected with the hole position updating apparatus 12. The interface unit 280 may include at least one of an external charger port, a wired/wireless data port, or a memory card port. The hole position updating apparatus 12 may perform appropriate control related to the connected external device in response to the connection of the external device to the interface unit 280.

The controller 290 controls an overall operation of the hole position updating apparatus 12. The controller 290 may be implemented as a processing circuit such as a microprocessor, a central processing unit (CPU), or an application processor (AP), but the scope of the present invention is not limited thereto. The controller 290 may execute software or a program that implements a function of the hole position updating apparatus 12.

The controller 290 may operate in a power cut-off mode by default, but may escape from the power cut-off mode in response to a wake-up signal, may update the current green information and the hole position, and may then enter the power cut-off mode again. When the controller 290 escapes from the power cut-off mode in response to the wake-up signal and updates the current green information and the hole position, the controller 290 may supply power to the temperature sensor 221, the position acquisition sensor 223, and the wireless communication unit 210 in response to the wake-up signal, may receive the atmospheric temperature from the temperature sensor 221, and receive GPS position data for the hole from the position acquisition sensor 223, may receive the current green information from the green information measuring apparatus 10 using the wireless communication unit 210, and may transmit at least one of current green information, atmospheric temperature data, and GPS position data to the server 20. The controller 290 may enter the power cut-off mode after transmitting soil temperature, humidity, and electrical conductivity data, atmospheric temperature data, and GPS position data to the server 20.

The controller 290 may further include a counter. In addition, the wake-up signal may be generated when a value of the counter reaches a predetermined value.

The hole position updating apparatus 12 installed on a green in a golf course where it is difficult to supply power at all times may stably operate for several months without the need for battery replacement by using a method of maintaining the power cut-off mode by default, escaping from the power cut-off mode only when there is a change in the hole position, updating the current green information and the hole position, and then entering the power cut-off mode again.

In particular, the controller 290 may control the power supply 250 to supply or cut off power to at least one of the controller 290 itself, the wireless communication unit 210, or the sensing unit 220. The controller 290 may include a wake-up signal detection circuit that should always operate in order to detect the above-described wake-up signal, and when operating in the power cut-off mode, power supply to the controller 290 itself, the wireless communication unit 210, and the sensing unit 220 except for the wake-up signal detection circuit may be cut off.

Next, a green information measuring method will be described with reference to FIG. 12 to FIG. 14.

Figure 12:
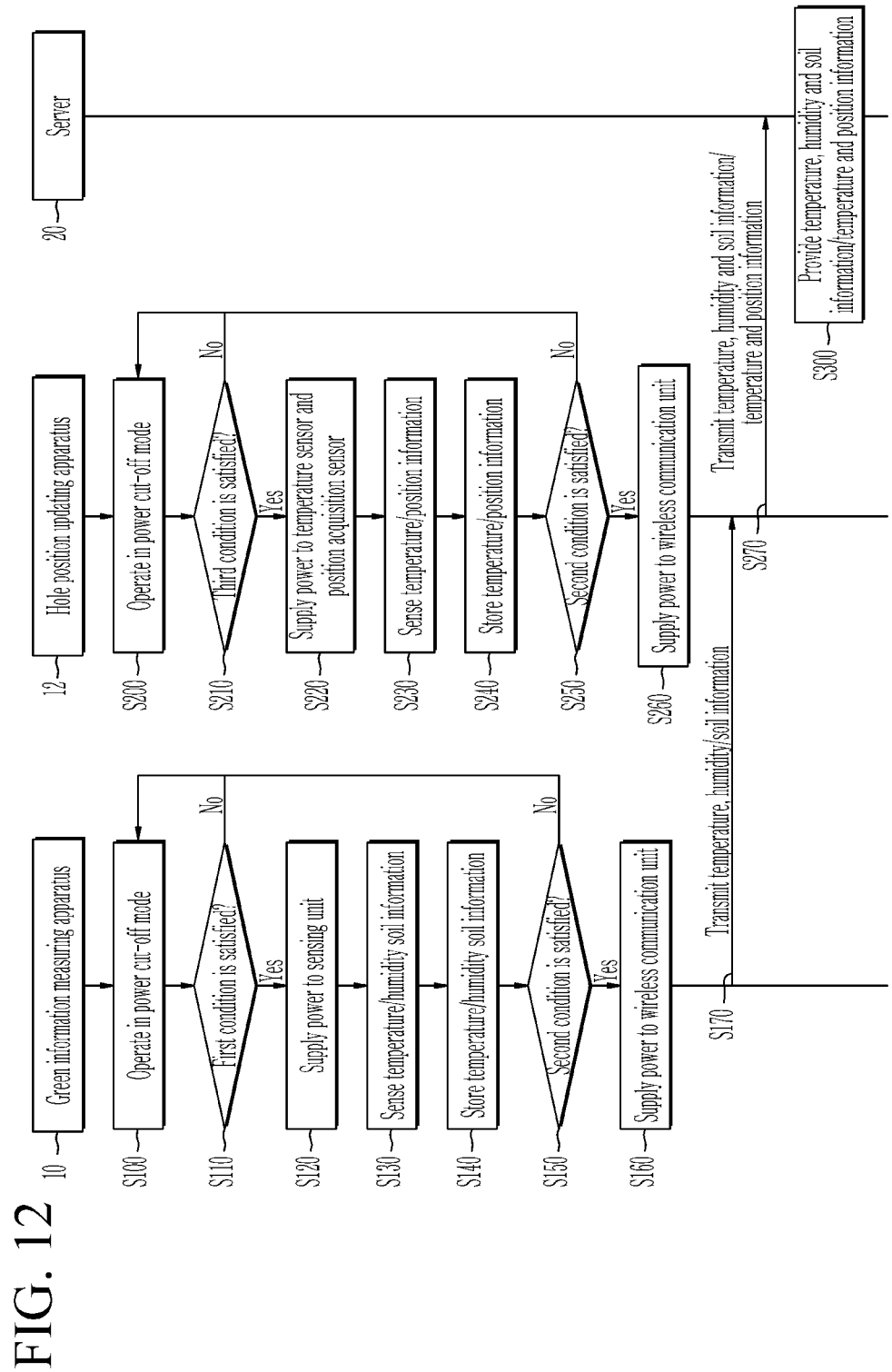
FIG. 12 illustrates a flowchart for describing a green information measuring method according to the embodiments.

FIG. 12 illustrates a flowchart for describing a green information measuring method according to the embodiments.

Referring to FIG. 12, the controller 190 of the green information measuring apparatus 10 operates in a power cut-off mode (S100). Herein, the controller 190 may control the power supply 150 to cut off power supply to all components except for a counter.

The controller 190 determines whether a first condition is satisfied (S110). For example, the controller 190 may determine whether a counter value reaches a predetermined first value. In addition, the controller 190 may determine, as the first condition, whether a first time has elapsed since recent sensing of soil information. Hereinafter, the first condition will be described as whether the counter value reaches the predetermined first value.

As a result of the determination, when the counter value does not reach the first predetermined value (S110, 'No'), the controller 190 enters the power cut-off mode, and the method may proceed to step S100.

As the result of the determination, when the counter value reaches the predetermined first value (S110, 'Yes'), the controller 190 controls the power supply 150 to supply power to the sensing unit 120 in response to a wake-up signal (S120).

Specifically, the controller 190 enters a wake-up mode in response to the wake-up signal and starts an operation, and then supplies power to the temperature sensor 121, the humidity sensor 122, and the EC sensor 123. The temperature sensor 121, the humidity sensor 122, and the EC sensor 123 sense soil information such as a temperature, humidity, and electrical conductivity of soil (S130). In this case, the controller 190 may receive data of the temperature, humidity, and electrical conductivity of the soil from the temperature sensor 121, the humidity sensor 122, and the EC sensor 123.

The controller 190 stores the data of the temperature, humidity, and electrical conductivity of the soil in the memory 130 (S140).

Next, the controller 190 determines whether a second condition is satisfied (S150). For example, the controller 190 may determine whether the counter value reaches a predetermined second value. Herein, the second value is greater than or equal to the first value. In addition, the controller 190 may determine, as the second condition, whether a second time has elapsed since transmission of soil information to the hole position updating apparatus 12. Hereinafter, the second condition will be described as whether a predetermined time has elapsed since the soil information is transmitted to the hole position updating apparatus 12.

As a result of the determination, when the predetermined time has not elapsed since the transmission of the soil information to the hole position updating apparatus 12 (S150, 'No'), the controller 190 enters the power cut-off mode, and the method may proceed to step S100.

As the result of the determination, when the predetermined time has elapsed since the transmission of the soil information to the hole position updating apparatus 12 (S150, 'Yes'), the controller 190 controls the power supply 150 to supply power to the wireless communication unit 110 in response to the wake-up signal (S160).

Then, the controller 190 reads the soil information stored in the memory 130 and transmits it to the hole position updating apparatus 12 (S170).

In the meantime, the controller 290 of the hole position updating apparatus 12 operates in the power cut-off mode (S200). Herein, the controller 290 may control the power supply 250 to cut off power supply to all components except for a counter.

The controller 290 determines whether a third condition is satisfied (S210). For example, the controller 290 may determine whether the counter value reaches a predetermined third value. In addition, the controller 290 may determine as a third condition whether a predetermined time has elapsed since recent sensing of hole position information.

In addition, the wake-up signal may be generated when the motion detection sensor 222 detects a movement. The controller 290 may control the power supply 250 to cut off power supply to all constituent elements except for a wakeup signal detection circuit for detecting a sensor input. In this case, the controller 190 may determine whether the motion detection sensor input is detected as the third condition.

Hereinafter, the third condition will be described as whether the counter value reaches the predetermined third value.

As a result of the determination, when the counter value does not reach the third predetermined value (S210, 'No'), the controller 290 enters the power cut-off mode, and the method may proceed to step S200.

As the result of the determination, when the counter value reaches the predetermined third value (S210, 'Yes'), the controller 290 controls the power supply 250 to supply power to the sensing unit 220 in response to the wake-up signal (S320).

Specifically, the controller 290 enters a wake-up mode in response to the wake-up signal and starts an operation, and then supplies power to the temperature sensor 221.

The temperature sensor 221 senses an ambient temperature (S130). In this case, the controller 290 may receive ambient temperature data from the temperature sensor 221.

In addition, the controller 290 may supply power to the position acquisition sensor 223. The position acquisition sensor 223 senses GPS position data corresponding to a current position (S230). In this case, the controller 290 may receive the current GPS position data from the position acquisition sensor 223.

Next, the controller 290 determines whether a second condition is satisfied (S250). For example, the controller 290 may determine whether the counter value reaches a predetermined second value. In addition, the controller 290 may determine whether a predetermined time has elapsed since receiving soil information from the green information measuring apparatus 10 as the second condition. Hereinafter, the second condition will be described as whether a predetermined time has elapsed since the soil information is received from the green information measuring apparatus 10.

As a result of the determination, when the predetermined time has not elapsed since receiving the soil information from the green information measuring apparatus 10 (S250, 'No'), the controller 290 enters the power cut-off mode, and the method may proceed to step S200.

As the result of the determination, when the predetermined time has elapsed since the soil information is received from the green information measuring apparatus 10 (S250, 'Yes'), the controller 290 controls the power supply 250 to supply power to the wireless communication unit 210 in response to the wake-up signal (S260).

Then, the controller 190 receives the soil information from the green information measuring apparatus 10, and transmits the soil information, the atmospheric information, and the position information to the server 20 (S270). After the transmission, the controller 290 enters the power cut-off mode again, and the method may proceed to step S200.

The controller 290 stores the data of the temperature, humidity, and electrical conductivity of the soil in the memory 130 (S140).

Next, the controller 290 determines whether a second condition is satisfied (S110). For example, the controller 290 may determine whether the counter value reaches a predetermined second value. In addition, the controller 290 may determine, as a second condition, whether a predetermined time has elapsed since transmission of soil information to the hole position updating apparatus 12. Hereinafter, the second condition will be described as whether the counter value reaches the predetermined second value.

As a result of the determination, when the counter value does not reach the second predetermined value (S150, 'No'), the controller 290 enters the power cut-off mode, and the method may proceed to step S100.

As the result of the determination, when the counter value reaches the predetermined second value (S150, 'Yes'), the controller 290 controls the power supply 250 to supply power to the wireless communication unit 210 in response to the wake-up signal (S160).

Then, the server 20 may provide the received green information, ambient temperature information, and hole position information to the mobile communication device 30 and the like.

In the above description, it has been described that the memory 130 stores a history of soil information and transmits the history of soil information to the hole position updating apparatus 12 when the second condition is satisfied, but every time soil information is sensed, the green information measuring apparatus 10 transmits it to the hole position updating apparatus 12, and the hole position updating apparatus 12 may store the history of soil information. Then, the hole position updating apparatus 12 may transmit the history of soil information to the server 20 when a predetermined condition is satisfied.

Next, green information provided by the server 20 will be described with reference to FIG. 13 and FIG. 14.

Figure 13:
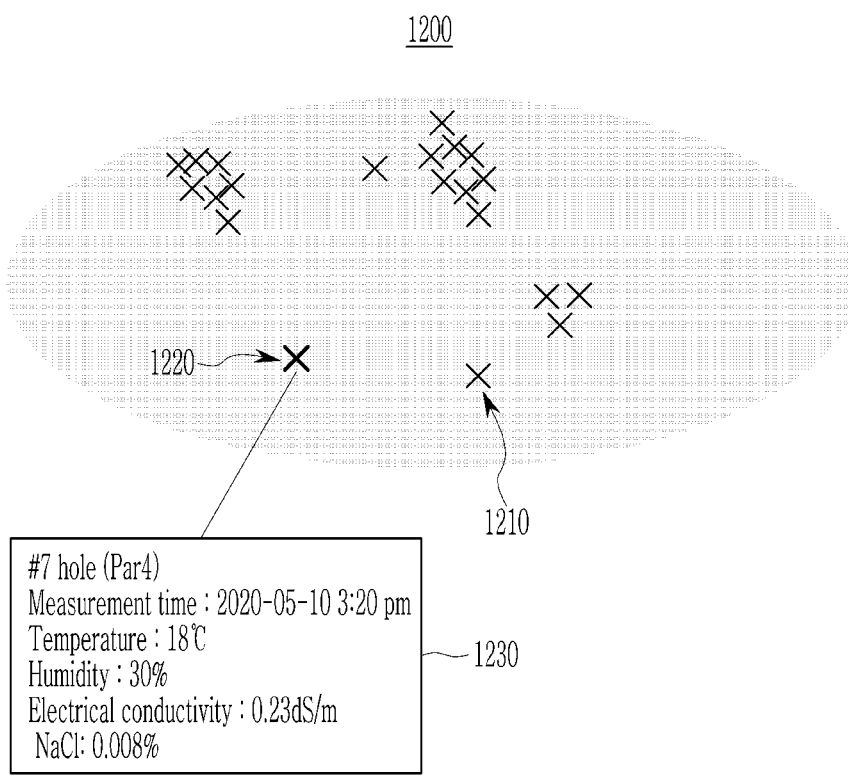
FIG. 13 and FIG. 14 each illustrate a screen on which information is provided by a green information measuring apparatus and is displayed according to embodiments.
Figure 14:
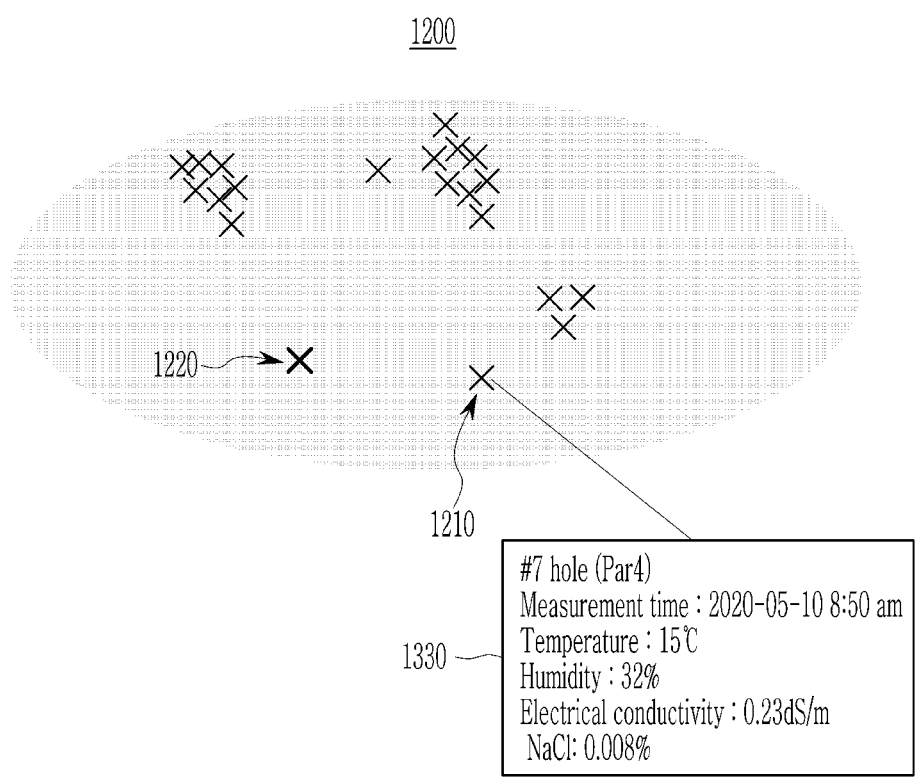

FIG. 13 and FIG. 14 each illustrate a screen on which information that is provided by the server 20 is displayed according to embodiments.

An information providing screen displays an indicator 1210 indicating a hole position history on a green 1200 and an indicator 1220 indicating a current hole position. The two indicators 1210 and 1220 may be displayed with different graphics.

A user, i.e., a manager, may check soil information at a corresponding position by selecting each of the indicators 1210 and 1220.

As illustrated in FIG. 13, when the user selects the indicator 1220 indicating the current hole position, the server 20 may display soil information 1230 measured at the corresponding position. The soil information 1230 may include information related to the corresponding position, information related to a measurement time, a temperature, humidity, electrical conductivity, salinity, etc., and information that can be processed using information collected by the green information measuring apparatus 10 may be entirely or selectively outputted.

As illustrated in FIG. 14, when the user selects the indicator 1210 indicating a previous hole position, the server 20 may display soil information 1330 measured at the corresponding position. The soil information 1330 may include information related to the corresponding position, information related to a measurement time, a temperature, humidity, electrical conductivity, salinity, etc., and information that can be processed using information collected by the green information measuring apparatus 10 may be entirely or selectively outputted.

That is, by installing the green information measuring apparatus 10 on a golf course, a manager may be conveniently provided with a condition of soil in an area where it is installed.

In addition, the server 20 may provide position information collected by the green information measuring apparatus 10 to the mobile communication device 30 or the golf distance measuring device 40 of a golfer, and the golfer may be provided with a position of a changed hole quickly.

In addition, since the green information measuring apparatus 10 is turned on by sensing a counter value or time, power consumption may be minimized, thereby enabling long-term use without frequently replacing the battery.

While this invention has been described in connection with what is presently considered to be practical embodiments, it is to be understood that the invention is not limited to the disclosed embodiments, but, on the contrary, is intended to cover various modifications and equivalent arrangements included within the spirit and scope of the appended claims.

What is claimed is:

1. A green information measuring system comprising:
a first device configured to measure an electrical characteristic of soil through at least one electrode when a first condition is satisfied; and
a second device configured to receive soil information of the soil from the first device when a second condition is satisfied, to obtain GPS position data corresponding to a current position when a third condition is satisfied, and to transmit the soil information and the GPS position data to a server,
wherein the first condition is whether a first time has elapsed since the electrical characteristic of the soil was recently measured,
wherein the second condition is whether a second time has elapsed since receiving the soil information of the soil from the first device,
wherein the third condition is whether a third time has elapsed since receiving the soil information of the soil from the first device.

2. The green information measuring system of claim 1, wherein
the first device includes a first coupling portion that is engageable to a first end of a flagpole, and
the second device includes a second coupling portion that is engageable to a body of the flagpole.

3. The green information measuring system of claim 2, wherein
a first device includes:
a housing configured to include the at least one electrode and the first coupling portion; and
a sensor configured to measure the electrical characteristic through the at least one electrode.

4. The green information measuring system of claim 3, wherein
an outer appearance of the housing has a cylindrical shape, and
the at least one electrode extends in a circumferential direction of the cylinder on a side surface of the housing.

5. The green information measuring system of claim 4, wherein
the at least one electrode is arranged spaced apart from each other in a height direction of the cylinder.

6. The green information measuring system of claim 3, wherein
an outer appearance of the housing has a cylindrical shape, and
the at least one electrode extends in a height direction of the cylinder on a side surface of the housing.

7. The green information measuring system of claim 6, wherein
the at least one electrode is arranged spaced apart from each other in a circumferential direction of the cylinder.

8. The green information measuring system of claim 3, wherein
an outer appearance of the housing has a cylindrical shape, and
a first end of the at least one electrode is coupled to a lower surface of the housing, while a second end extends in a height direction of the cylinder to be away from the lower surface of the housing.

9. The green information measuring system of claim 4, wherein
the housing includes at least one opening extending through an exterior and an interior,
the sensor is positioned in an inner space positioned inside the housing, and
the sensor and the at least one electrode are electrically connected to each other through the at least one opening.

10. The green information measuring system of claim 4, wherein
the first device includes:
an antenna electrode configured to extend in a circumferential direction of the cylinder on a side surface of the housing and closest to an upper surface of the cylinder; and
a wireless communication unit connected to the antenna electrode to provide connection to the second device.

11. A green information measuring method comprising:
a first device measuring an electrical characteristic of soil through at least one electrode when a first condition is satisfied; and
a second device receiving soil information of the soil from the first device when a second condition is satisfied, obtaining GPS position data corresponding to a current position when a third condition is satisfied, and transmitting the soil information and the GPS position data to a server,
wherein the first condition is whether a first time has elapsed since the electrical characteristic of the soil was recently measured,
wherein the second condition is whether a second time has elapsed since receiving the soil information of the soil from the first device,
wherein the third condition is whether a third time has elapsed since receiving the soil information of the soil from the first device.

* * * * *